United States Patent [19]
Warren

[11] Patent Number: 5,645,217
[45] Date of Patent: Jul. 8, 1997

[54] TWO-PART COMPOUND SPRAY-APPLICATION SYSTEM AND METHOD

[76] Inventor: Daniel Warren, 18 Church St., South Carver, Mass. 02366

[21] Appl. No.: 629,913

[22] Filed: Apr. 10, 1996

Related U.S. Application Data

[63] Continuation of Ser. No. 224,419, Apr. 8, 1994, abandoned.
[51] Int. Cl.$^6$ .................................................. A62C 37/00
[52] U.S. Cl. .......................... 239/75; 239/112; 239/135; 239/416.2
[58] Field of Search ........................... 239/8, 11, 13, 239/112, 113, 127, 134, 135, 304, 413, 414, 416.2, 432, 75

[56] References Cited

U.S. PATENT DOCUMENTS

| | | |
|---|---|---|
| 3,008,808 | 11/1961 | Hodges ............................. 239/134 X |
| 4,267,299 | 5/1981 | Oechsle, III . |
| 4,304,529 | 12/1981 | Gerich . |
| 4,549,676 | 10/1985 | Gerich ................................. 239/112 X |
| 4,725,713 | 2/1988 | Lehrke . |
| 5,058,805 | 10/1991 | Anderson et al. .................. 239/135 X |
| 5,178,326 | 1/1993 | Kukesh et al. ............................ 239/8 |
| 5,294,052 | 3/1994 | Kukesh ................................... 239/112 |

Primary Examiner—Andres Kashnikow
Assistant Examiner—Lisa Ann Douglas
Attorney, Agent, or Firm—Brian M. Dingman

[57] ABSTRACT

A spray application system and method for a two-part, self-setting compound, comprising a source of the first part of the compound, a source of the second part of the compound, a spray device for applying the compound, a mixing assembly for intermingling the two parts of the compound, a heated hose downstream of the mixing device for delivering the compound to the spray device, a first pump or set of pumps for delivering the first part of the compound to the mixing device, and a second pump or set of pumps for delivering the second part of the compound to the mixing device.

11 Claims, 1 Drawing Sheet

TWO-PART COMPOUND SPRAY-APPLICATION SYSTEM AND METHOD

This is a continuation of Ser. No. 08/224,419 filed Apr. 8, 1994, now abandoned.

FIELD OF INVENTION

This invention relates to a system and method for spray-applying a two-part, self-setting compound which is particularly adapted for delivering the parts at a temperature which promotes their spray application as well as the self-setting reaction.

BACKGROUND OF INVENTION

Two-part, self-setting compounds such as epoxies are typically mixed in the appropriate ratio amounts and then applied to the surface or part as desired. Since the compounds react or set-up in a given amount of time, it is necessary to mix only sufficient compound that can be used before it sets up too much to be applied. Accordingly, the use and application of these compounds is a tedious, slow and expensive proposition.

"Aquatapoxy A-5 (or A-6)" is a proprietary, two-part self-setting compound which is designed to be applied under water or to wet surfaces. The product hardens into a ceramic which is very resistive to chemical attack, smooth, hard, and difficult to break or chip. Aquatapoxy is manufactured by American Chemical Corp., St. Louis, Mo. This product has to date been difficult to use because it must be mixed and painted on surfaces to be coated. The two parts of the compound are each very thick, making their handling all the more difficult. Accordingly, Aquatapoxy and other water-resistant epoxies have not gained wide acceptance for use in sealing water leaks, particularly in underground pipes.

There are hundreds of thousands of miles of underground pipe in the United States alone. Many of those pipes carry water or liquid which, of course, should stay in the pipe and not leak into the surrounding ground. Those pipes, as well, should not be infiltrated by ground water. Accordingly, it is desirable and sometimes critical to maintain the integrity of the pipes along their length. This proves impossible in practice, however, due to corrosion and other factors which cause pipes to leak.

This has proven to be a particularly vexing problem for sewer pipes and water supply lines, many of which have degraded to the point where they now have to be fixed. The solutions for fixing the pipes to date have been either to dig up the pipe and replace it, which is inordinately expensive and can cause major disruption to traffic and city infrastructure, or to insert in the pipe a slightly smaller-diameter plastic pipe liner. This, too, requires access to the pipe at relatively closely spaced locations and so accordingly also requires a lot of digging. In addition, these liners are expensive and can be difficult to install. Accordingly, there is a great need for some means of relatively quickly and inexpensively sealing water leaks in pipes and other underground structures.

SUMMARY OF THE INVENTION

It is therefore an object of this invention to provide a system and method for quickly and easily spray applying two-part self-setting compounds.

It is a further object of this invention to provide such a system and method which allows the entire interior surfaces of underground pipes to be coated even while wet to seal liquid leaks.

This invention features a spray application system and method for a two or more-part, self-setting compound such as Aquatapoxy which allows the compound to be spray applied for sealing liquid leaks in structures. The spray application system of this invention includes a source of the first part of the compound and a source of the second part of the compound, for example containers up to the size of 55 gallon drums, or possibly larger containers as necessary to supply the desired amount of the parts for application. There is a spray device for applying the compound, and a mixing assembly for intermingling the two parts of the compound. A heated hose downstream of the mixing device delivers the compound to the spray device. There is a first pumping means, which may include one or more pumps, for delivering the first part of the compound to the mixing device, and a second pumping means, which also may include one or more pumps, for delivering the second part of the compound to the mixing device.

The Aquatapoxy consists of two liquid portions which are both very viscous and therefore difficult to pump. It has been found that the portions are easier to pump, and therefore easier to deliver to the spray device, if they are heated, and maintained in such a state all the way to the spray tip. This also facilitates more volumetrically-controlled delivery of each of the two portions of the compound to the spray device. Accordingly, the system preferably further includes means for heating the contents of the containers that hold the two parts of the compounds, for example by using temperature-controlled heaters. Recirculating pumps may be used in the containers to ensure mixing and uniform heating of the two portions. The heated hose may be heated by including an electrical resistance heating element for the hose and then using a temperature-controlled power supply for the electrical resistance heating element to maintain an elevated compound temperature in the heated hose. The hoses may also be heated with steam. The hoses that carry the liquids from the containers to the mixing assembly should be insulated or possibly heated themselves as necessary to maintain the portions at an elevated temperature so they flow better, and for volume control at the spray gun.

The pumping means for each of the two portions of the compound may include a low pressure pump for drawing the portions out of the containers. Each of the pumping means may further include high pressure pumps, fed from the low pressure pumps, for elevating the pressure of the two portions delivered to the mixing assembly. The pumps are preferably positive displacement pumps which deliver carefully controlled volumes of each of the portions to the mixing assembly so that the compound is mixed in the ratio required to set-up as set forth in the manufacturer's specification.

The mixing assembly preferably includes a static mixer with a mixing block upstream of the static mixer. There may further be included flow control valves upstream of the mixing assembly. The valves may be mechanically linked to operate in unison. There may also be included means for flushing the mixing assembly, hose and spray device. This may be accomplished with a source of flushing solvent under pressure.

In a more specific embodiment, this invention features a spray application system for a two-part self-setting compound comprising a first temperature controlled container for maintaining the first part of the compound at an elevated temperature, and a second temperature-controlled container for maintaining the second part of the compound at an elevated temperature. There are a pair of low pressure pumps for drawing the parts out of the containers, and a pair of high pressure pumps, fed from the low pressure pumps, for boosting the pressure of the parts. There is a static mixing assembly, fed from the high pressure pump, for intermingling the parts, a spray device for applying the compound, and a hose with a temperature-controlled heat trace therein for delivering the compound from the static mixing assembly to the spray device. The low pressure and high pressure pumps may be air operated positive displacement pumps. There may further be included hoses for carrying the parts from the low pressure pumps to the high pressure pumps. There may also be insulated hoses for carrying the parts from the high pressure pumps to the static mixing assembly. Finally, there may be means for supplying a flushing solvent under pressure to the static mixing assembly, the hose, and the spray device.

This invention features a method of spray applying a two part, self-setting, liquid compound, comprising the steps of: providing separate containers for the two parts of the compound; heating the contents of the containers to decrease the viscosity of the contents; mixing the heated contents of the containers; pumping the liquids from each container to a downstream mixing assembly for intermingling the two parts of the compound; and providing a heated hose between the mixing assembly and a downstream spray device for applying the mixed compound.

BRIEF DESCRIPTION OF THE DRAWING

Other objects, features and advantages will occur to those skilled in the art from the following description of a preferred embodiment and the accompanying drawing, FIG. 1, which is a schematic diagram of a preferred embodiment of the spray application system for a two-part, self-setting compound according to this invention.

DESCRIPTION OF THE PREFERRED EMBODIMENT

Figure 1:
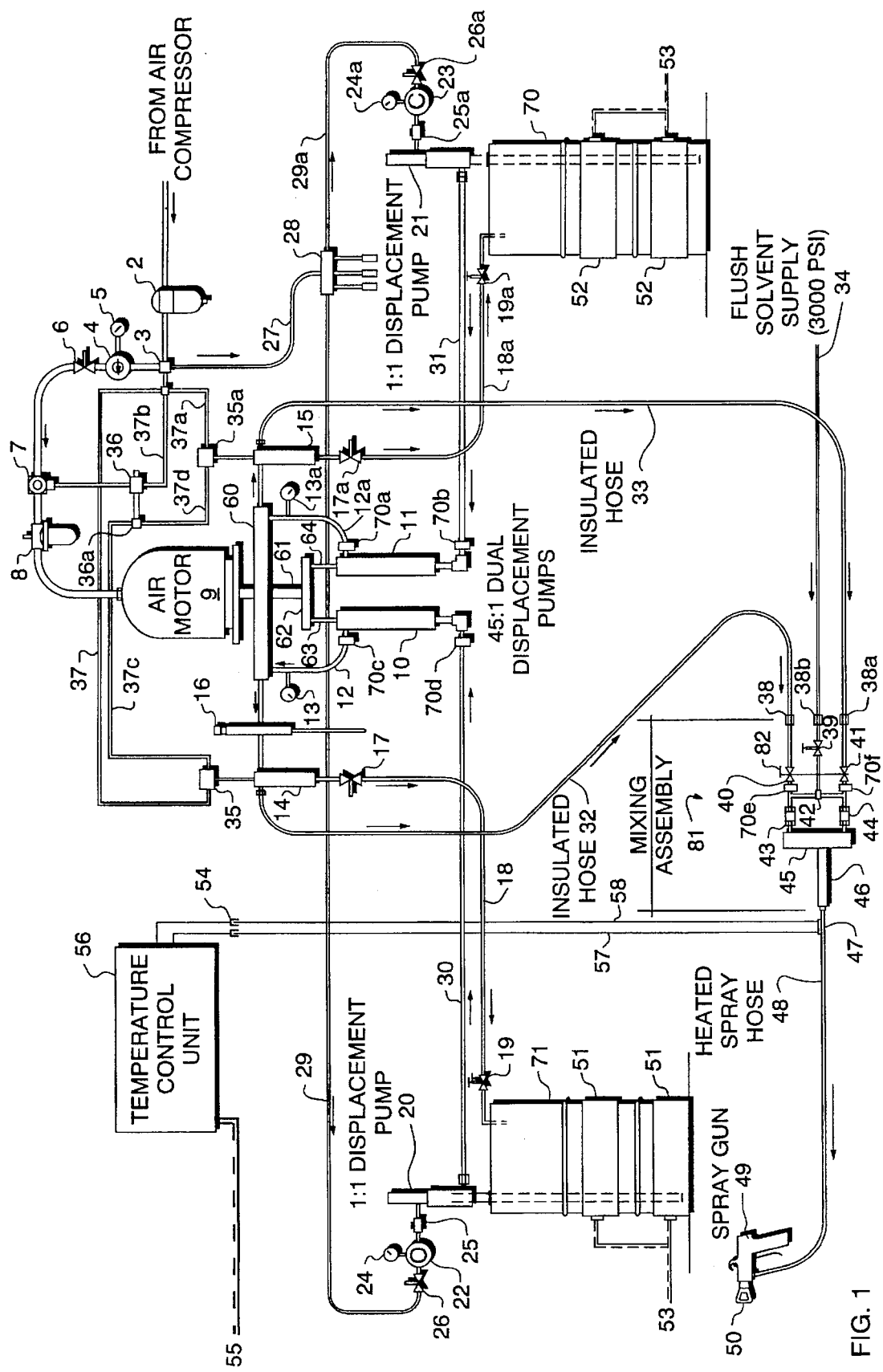

FIG. 1 schematically depicts the preferred embodiment of the two-part liquid, self-setting compound spray application system of this invention. This system has been developed for spray applying Aquatapoxy A-5, A-6 and A-7 products manufactured by American Chemical Corp., St. Louis, Mo. Container 71, which may be a 55 gallon drum, holds part A of the Aquatapoxy, and container 70, which may also be a 55 gallon drum, holds part B of the Aquatapoxy. Both parts of the Aquatapoxy are very viscous at room temperature and are therefore difficult to pump and difficult to carefully, volumetrically deliver to the spray applicator. Part B is extremely viscous and almost impossible to pump at room temperature. The parts must be delivered in carefully controlled flow streams so that they are mixed in the proper ratio for the desired purpose as established by the manufacturer. For Aquatapoxy, the correct ratio of part A to part B is 1:1.

The containers 70 and 71 are maintained at an elevated temperature using thermostatically controlled 120V drum heater belts 51 and 52 fed by 120V electric supply 53, and/or immersed temperature exchange coils, not shown, fed with hot water. Preferably, the part A supply drum is maintained at about 170° F. to 180° F. and the part B supply drum is maintained at about 190° F. to 220° F. This keeps the portions at about the same viscosity so that their volumetric ratio at the spray tip is correct.

The two parts of the Aquatapoxy compound are delivered to spray gun 49 with two sets of pumping means, each of which in the preferred embodiment includes a first, lower pressure positive displacement pump, and a second, higher pressure positive displacement pump fed by the first positive displacement pump. Positive displacement pumps are used because they can be calibrated to deliver very exact volumes of the liquids as desired.

The four pumps in the system are operated by compressed air as follows. Compressed air from a diesel-fired trailer compressor is provided at Chicago pneumatic fitting 1. Air line filter 2 filters the primary air supply and includes a water separator. It has a maximum working pressure of 250 psi. Air manifold 3 distributes the filtered air as necessary. This lower pressure air is provided over line 27 which connects the main air supply to auxiliary air manifold block 28 to operate the lower pressure pumps which draw the parts out of the containers. From this manifold air is delivered over ¼" air supply hoses 29 and 29a to positive displacement pumps 20 and 21, respectively. Pumps 20 and 21 are each Graco Fast-Flo, Model No. 226-947 1:1 stainless steel displacement pumps with polyethylene packings made by Graco, Inc., Minneapolis, Minn. The input air pressure to these pumps is adjusted as necessary using regulators 22 and 23 with pressure gauges 24 and 24a, respectively. ¼" ball valve air shutoff valves 26 and 26a are included along with in-line air lubricators 25 and 25a. The air pressure to the part A pump 20 is preferably set to 70 psi and the air pressure to the part B displacement pump 21 is preferably set to 100 psi, because the part B is more viscous.

After the portions in the containers reach the desired temperature, pumps 20 and 21 are used to circulate the liquid within the drums to help provide even heating to the fluid, to keep the fluid properly mixed, and to help remove any air entrained in the viscous liquid so that the sprayed coating does not have any pinholes from entrained air bubbles. This recirculation is accomplished by closing valves 40 and 41 and opening valves 17 and 17a. When it is desired to start applying the compound, valves 17 and 17a are closed and valves 40 and 41 are opened to direct the portions to the mixing assembly and spray gun, as explained below.

The part A of the compound is pumped through hose 30 to second, high-pressure positive displacement pump 10. Hose 30 is a 4000 psi working pressure ¾" hose insulated with a ½" neoprene casing. Similarly, the part B of the compound is pumped to second, high-pressure positive displacement pump 11 through hose 31 which is also a 4000 psi working pressure ¾" hose insulated with a ½" neoprene casing. Part A high pressure pump 10 is one pump of a Binks Model 101-1618C Fluid Section dual pump unit, Binks Manufacturing Company, Franklin Park, Ill. The pump is a severe duty cylinder displacement pump with TEFLON and Ultra High Molecular Weight Polyethylene (UHMWP) packings. The cylinder stroke was shimmed ¼" to reduce the flow rate per stroke of the less-viscous part A. Part B high pressure displacement pump 11 is the other pump of the Binks unit with the same packing arrangement. The bottom end stop ball of pump 11 had added to it a heavy duty return assist spring sufficient to assist closing of the intake valve against the viscous part B component. The packings for the pumps are alternating UHMWP and TEFLON packings, with outside packings of UHMWP.

Pumps 10 and 11 are operated by air motor 9, which is a Binks 41-12304-C BIO air motor with a 90 psi maximum air input pressure and a 4050 psi maximum output pressure. Motor 9 is supplied with air from manifold 3 through regulator 4 rated at 300 psi working pressure with a regulated range of 0–125 psi, adjusted to operate at from 65 to 70 psi as read out by pressure gauge 5. ¾" NPT stainless body bleed-type ball valve 6 is used for a shut-off. High pressure air shut-off 7 is an air solenoid controlled automatic shut-off valve for shutting off the supply to air motor 9 if the pressure of the output of pumps 10 or 11 is too high, as further explained below. 250 psi air line lubricator 8 has a 16 ounce bowl capacity with a ¾" NPT inlet and outlet.

Motor 9 drive shaft 61 is coupled to shafts 63 and 64 of pumps 10 and 11, respectively, through member 62. This arrangement drives pumps 10 and 11 together so that they simultaneously deliver the exact same volume of parts A and B to the supply lines that feed spray gun 49. Pressure hoses 12 and 12a with pressure gauges 13 and 13a feed components A and B from pumps 10 and 11, respectively, to liquid manifold 60. High pressure relief valve 16 in manifold 60 is a blow-off valve set to actuate at 3500 psi on the part A pressure side. Component A filter cylinder 14 contains a 60 mesh screen to filter particulates. The system is set up to recycle some or all of the part A flow to container 71 through line 18 which is a ⅜" hose rated at 4000 psi as controlled by ⅜" recycling shut-off valve 17 at the bypass position of filter cylinder 14 and high pressure gate valve 19 to control the rate of flow recycling to dram 71. Part B component filter cylinder 15 has had the filter mesh removed to remove the flow restriction caused by the filter mesh. There is a similar return arrangement to container 70 using line 18a and valve 17a and 19a that are identical to the components on the part A side. Preferably, motor 9, pumps 10 and 11, filters 14 and 15, and the coupling mechanism from motor 9 to pumps 10 and 11 are all part of a Binks Model Formulator K unit.

Each of filter cylinders 14 and 15 has a pressure activated switch 35 and 35a, respectively, which monitors the component pressure at the filter outlet. The operating range of switches 35 and 35a is 350 to 5000 psi. The switches are set to actuate main air shut-off 7 at 3500 psi. Switch 35 is supplied with air through line 37 and switch 35a is supplied with air through line 37a. When either switch is operated it provides air through line 37c or 37d as appropriate to portion 36a of air shut-off reset control switch 36 which is caused to supply air provided to it over line 37b to shut-off 7 to close the main air supply to air motor 9. Switches 35 and 35a are air valves made by The Aro Corporation. Valve 36 is a over-run control valve that can be set to shut off air supply when the pressure is too high or too low. Valve 36 may be an ARO-STOP valve also from The Aro Corporation. This arrangement results in motor 9 being shut-off if the output of either pumps 10 or 11 goes above 3500 psi. Lines 37 through 37d are all ⅛" plastic control air hoses.

Component A is provided to mixing assembly 81 through insulated hose 32. Similarly, component B is provided to mixing assembly 81 through insulated 33. Hoses 32 and 33 are both 4000 psi working pressure ⅜" hoses insulated with a ½" neoprene casing. Quick disconnect couplings 38 and 38a couple hoses 32 and 33, respectively, to mixing assembly 81. Assembly 81 includes stainless steel through-hole mixing block 45, and ⅜" NPT stainless steel helical static mixer 46, a TAH Pharmaceutical Grade stainless steel mixer. High pressure ⅜" shut-off ball valves 40 and 41 are mechanically linked together with operating assembly 82 so that the valves can be opened and closed together to carefully control the flow of both components into mixing block 45. Part A flow control valve 43 is an adjustable in-line restriction valve set at approximately 40% restriction. Component B in-line flow control valve 44 is also an adjustable in-line restriction valve set at the full open position. This arrangement helps to achieve the same flow rate in each line for the desired 1:1 mixing.

Heated spray hose 48 is a ⅜", 5600 psi working pressure hose with integral heat trace and protective wrap to maintain the mixed compound at approximately 225° F. so that it flows freely through hose 48 to spray gun 49. Also, this provides the mixed compound at an elevated temperature which decreases the set-up time. Spray gun 49 is a Graco model J92A rated at 5000 psi working pressure and includes spray tip 50 which is a Graco model number 627 spray tip. Quick disconnect 47 allows hose 48 to be disconnected from mixer 46. The temperature of hose 48 is controlled using electronic monitoring and temperature control unit 56 which provides power over 240V heavy duty thermostatically controlled spray hose heat trace 57 set to 225° F. The temperature of the hose is sensed with thermocouple heat sensor 58. Electrical heavy duty locking plug connections 54 couple unit 56 to heat trace 57 and temperature sensor 58. Unit 56 is provided with 240V power over lines 55.

Check valves 70a through 70e, 43 and 44, ensure that the flow of these viscous liquids is always in the proper direction, with no backflow which would change the volume ratio of the portions of the compound which could lead to an incorrect mix at the spray gun.

When the spray application process has been completed, it is important to flush the mixed compound as quickly as possible from mixing assembly 81, hose 48 and spray gun 49 to keep those components clean. This is accomplished using alcohol as a flush solvent provided at 3000 psi over hose 34 coupled to quick disconnect 38b. High pressure gate valve 39 controls the flow of solvent into flush solvent tee 42 which routes the solvent to valves 43 and 44 and then into mixing block 45, etcetera.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. A spray application system for a two-part, self-setting compound, comprising:

a first container for the first part of the compound;

a first temperature-controlled heater for maintaining the first part of the compound in said first container at a selected elevated temperature;

a first low pressure pump for drawing the first part of the compound out of said first container;

a first recirculating loop for selectively returning some or all of the first part of the compound from said first low pressure pump back into said first container, for mixing and evenly heating the first part of the compound in said first container;

a second container for the second part of the compound;

a second temperature-controlled heater for maintaining the second part of the compound in said second container at a selected elevated temperature;

a second low pressure pump for drawing the second part of the compound out of said second container;

a second recirculating loop for selectively returning some or all of the second part of the compound from said second low pressure pump back into said second container, for mixing and evenly heating the second part of the compound in said second container;

a first high-pressure, positive-displacement pump fed by said first low pressure pump, for boosting the pressure of the first part of the compound;

a second high-pressure, positive-displacement pump fed by said second low pressure pump for boosting the pressure of the second part of the compound;

an air-driven motor mechanically coupled to both of said high-pressure pumps for driving both of said high-pressure pumps in tandem to ensure correct relative flow of both parts of the compound;

a static mixer, fed from both of said high-pressure pumps, for intermingling the two parts of the compound;

a spray device for spray applying the compound; and a temperature-controlled, heated hose between said static mixer and said spray device, for maintaining the compound at an elevated temperature until it is sprayed.

2. The spray application system of claim 1 in which said mixing assembly further including a mixing block upstream of said static mixer.

3. The spray application system of claim 1 further including flow control valves upstream of said static mixer.

4. The spray application system of claim 3 in which said flow control valves are mechanically linked to operate in unison.

5. The spray application system of claim 1 in which said heated hose includes an electrical resistance heating element for said hose.

6. The spray application system of claim 5 further including a temperature-controlled power supply for said electrical resistance heating element to maintain an elevated compound temperature in said heated hose.

7. The spray application system of claim 1 in which said first and second low pressure pumps are air operated positive displacement pumps.

8. The spray application system of claim 1 in which said high pressure pumps are air operated positive displacement pumps.

9. The spray application system of claim 1 further including insulated hoses for carrying the parts from said low pressure pumps to said high pressure pumps.

10. The spray application system of claim 1 further including insulated hoses for carrying the parts from said high pressure pumps to said static mixing assembly.

11. The spray application system of claim 1 further including means for supplying a flushing solvent under pressure to said static mixing assembly, said hose, and said spray device.

* * * * *